(12) United States Patent
Hanyu

(10) Patent No.: US 6,485,089 B2
(45) Date of Patent: Nov. 26, 2002

(54) CAR BODY ASSEMBLING METHOD AND BODY STRUCTURE OF A VEHICLE

(75) Inventor: Atsushi Hanyu, Yokosuka (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/819,894

(22) Filed: Mar. 29, 2001

(65) Prior Publication Data

US 2001/0033096 A1 Oct. 25, 2001

(30) Foreign Application Priority Data

Apr. 25, 2000 (JP) ...................................... 2000-124373

(51) Int. Cl.⁷ ............................................. B62D 25/00
(52) U.S. Cl. .................. 296/203.01; 296/185; 296/193; 296/188; 296/210; 29/897.2
(58) Field of Search ................................ 296/185–188, 296/193, 196–197, 203.01, 205, 30, 210; 29/897.2

(56) References Cited

U.S. PATENT DOCUMENTS

| | | | | |
|---|---|---|---|---|
| 3,697,124 A | * | 10/1972 | Wessells ................. | 296/185 X |
| 4,252,364 A | * | 2/1981 | Toyama et al. ............. | 296/185 |
| 4,618,163 A | * | 10/1986 | Hasler et al. ........... | 296/205 X |
| 4,826,238 A | * | 5/1989 | Misono et al. .............. | 296/205 |
| 4,914,802 A | * | 4/1990 | Takao et al. ............ | 296/196 X |
| 5,018,781 A | * | 5/1991 | Kumasaka et al. ......... | 296/196 |
| 5,480,208 A | * | 1/1996 | Cobes et al. ................ | 29/897.2 |
| 6,050,323 A | * | 4/2000 | Soell et al. .................. | 164/108 |
| 6,214,478 B1 | * | 4/2001 | Soell et al. ............ | 296/203.01 |
| 6,334,252 B1 | * | 1/2002 | Sato et al. ............. | 29/897.2 X |

FOREIGN PATENT DOCUMENTS

| | | |
|---|---|---|
| DE | 198 16 034 | 10/1999 |
| EP | 0 832 705 | 4/1998 |
| JP | 62088674 | 4/1987 |
| JP | 62088675 | 4/1987 |
| JP | 06286646 | 10/1994 |
| JP | 8-243668 | 9/1996 |
| JP | 10-181635 | 7/1998 |

* cited by examiner

Primary Examiner—D. Glenn Dayoan
Assistant Examiner—Jason Morrow
(74) Attorney, Agent, or Firm—McDermott, Will & Emery

(57) ABSTRACT

A roof structure 2 is divided into three roof constituent parts, i.e., a front portion 2F, a center portion 2C and a rear portion 2R, and they are formed by casting and connected to each other and sub-assembled into the roof structure 2. Each of left and right body side structures 3 are divided into three roof constituent parts, i.e., a front portion 3F, a center portion 3C and a rear portion 3R, and they are formed by casting and connected to each other and sub-assembled into the body side structure 3. The roof structure 2 and the left and right body side structures 3 are assembled and connected to each other on a main line, thereby constituting an upper body 1.

19 Claims, 15 Drawing Sheets

CAR BODY ASSEMBLING METHOD AND BODY STRUCTURE OF A VEHICLE

BACKGROUND OF THE INVENTION

The present invention relates to a body assembling method and a body structure of a vehicle.

Conventionally, as a body structure of a vehicle, there is a known structure as disclosed in Japanese Patent Application Laid-open No. H8-243668 in which three units, i.e., a cabin, a front compartment and a rear compartment are separately formed and they are integrally assembled on an assembling line, and there is another known structure as disclosed in Japanese Patent Application Laid-open No. H10-181635 in which a body side structure is integrally formed by casting, and this is assembled into another body structure on an assembling line.

SUMMARY OF THE INVENTION

In any of the cases, body parts are integrally formed into some of larger unit parts, and these unit parts are assembled together and connected by welding. However, since each of the parts is large in size, and formation error of each of the unit parts is accumulated, there occurs a problem of how to enhance the assembling precision.

The present invention provides a body assembling method and a body structure of a vehicle in which the assembling precision is remarkably enhanced, the number of assembling jigs is reduced as small as possible to enhance the assembling operability, and rigidity of the body can be enhanced.

A body assembling method of a vehicle according to the present invention comprises: a step for sub-assembling a roof structure by connecting a plurality of roof parts made of light-metal formed by casting divided in a longitudinal direction; a step for sub-assembling left and right body side structures by connecting a plurality of body side parts made of light-metal formed by casting divided in the longitudinal direction; and a main step for connecting these sub-assembled roof structure and left and right body side structures.

A body structure of a vehicle of the invention comprises a roof structure obtained by connecting a plurality of roof parts made of light-metal formed by casting divided in a longitudinal direction, left and right body side structures obtained by connecting a plurality of body side parts made of light-metal formed by casting divided in the longitudinal direction, wherein said left and right body side structures and roof structure are connected each other and form upper body.

DETAILED DESCRIPTION OF THE PREFERRED EMBODIMENT

An embodiment of the present invention's body structure of a vehicle will be described in detail with reference to the drawings.

Figure 1:
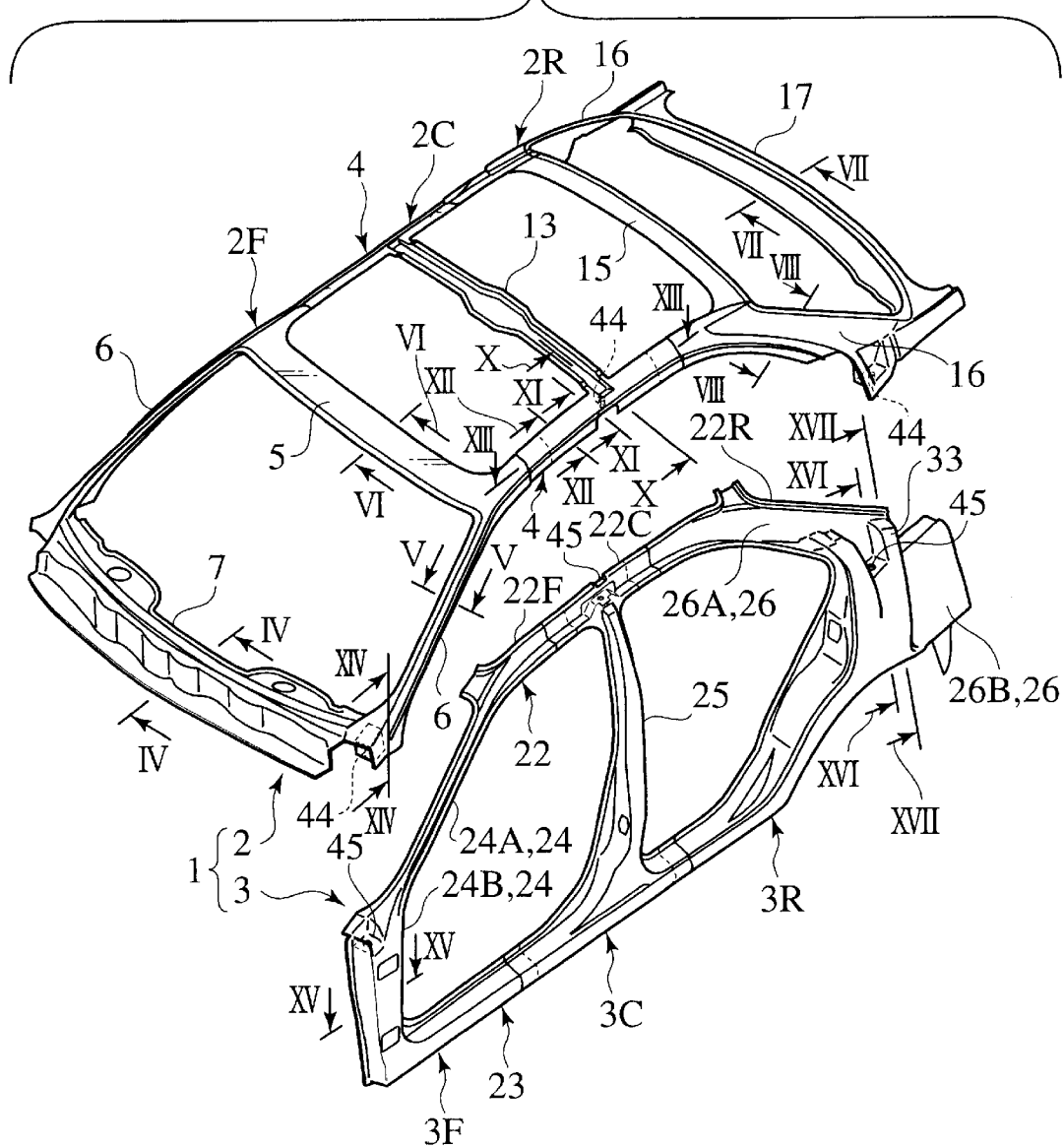
FIG. 1 is an exploded perspective view of an upper body according to an embodiment of the present invention.
Figure 2:
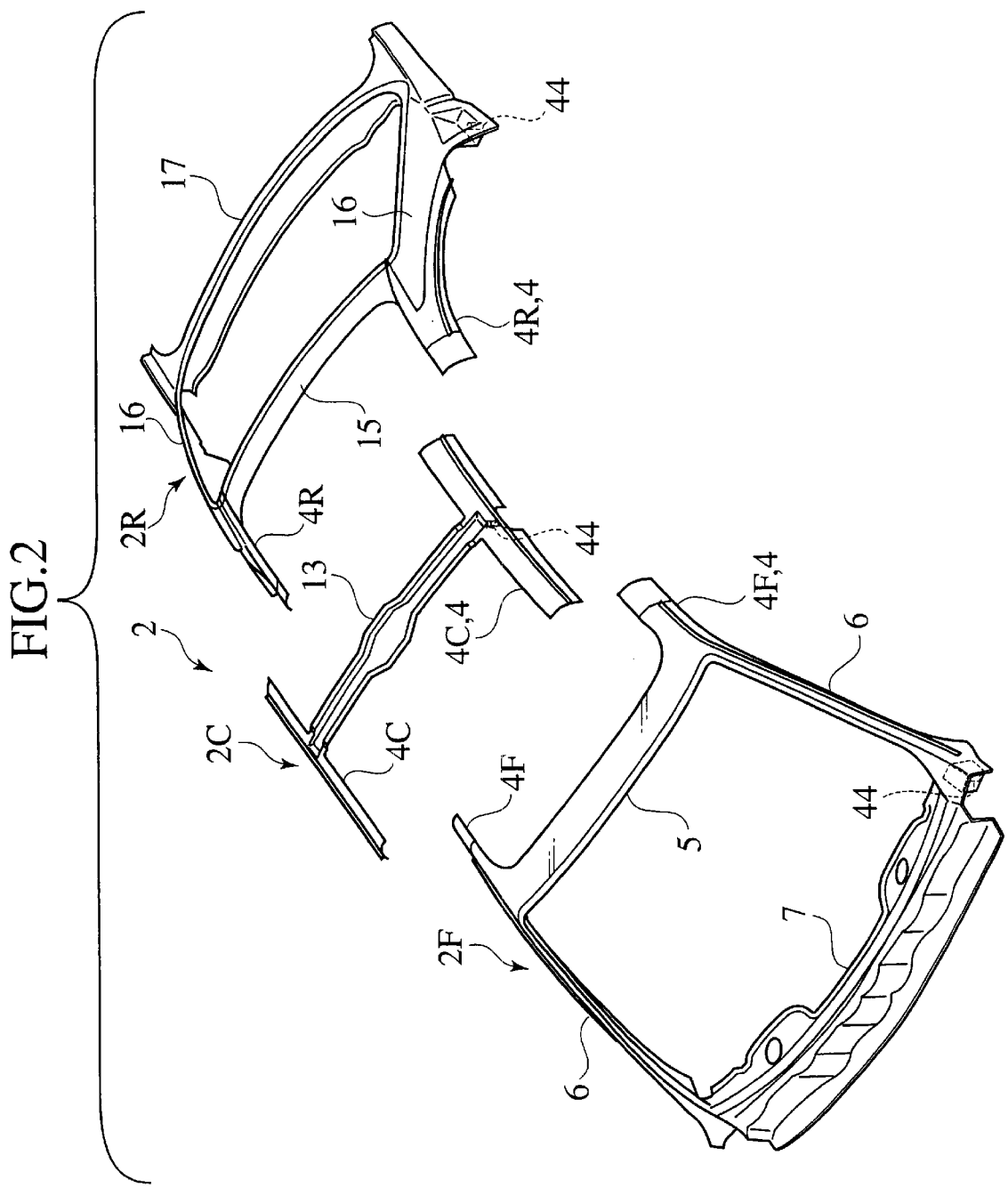
FIG. 2 is an exploded perspective view of a roof structure of the embodiment according to the invention.
Figure 3:
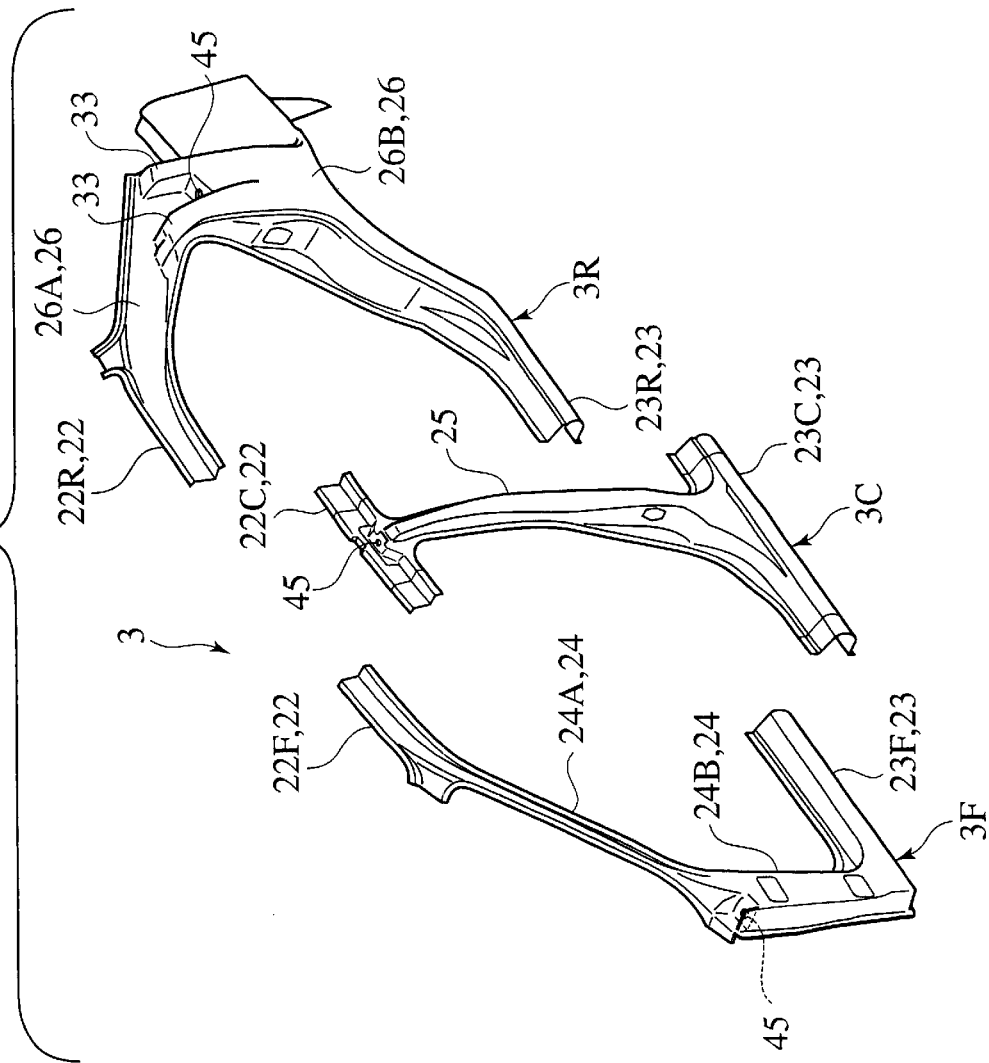
FIG. 3 is an exploded perspective view of a body side structure of the embodiment according to the invention.

In FIGS. 1 to 3, an upper body 1 of a cabin comprises a roof structure 2 and a body side structure 3.

Both the roof structure 2 and the body side structure 3 are made of light-metal such as aluminum alloy.

The roof structure 2 comprises three roof parts, i.e., a front portion 2F, a center portion 2C and a rear portion 2R which are longitudinally divided by a roof side rail outer 4 formed as a roof side rail portion of the roof structure 2. Each of these roof parts is formed by die casting to secure surface precision.

The front portion 2F comprises a roof rail front 5, and front pillar upper outers 6 as portions of left and right front pillar portions. In this embodiment, a cowl top 7 is integrally formed on lower portions of the left and right front pillar upper outers 6.

Figure 4:
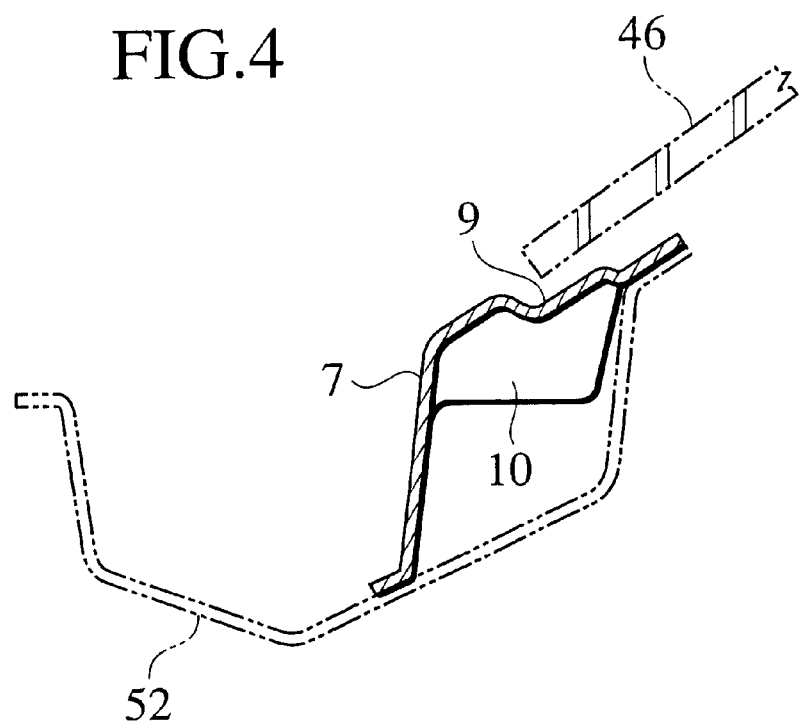
FIG. 4 is a sectional view taken along a line IV—IV in FIG. 1.
Figure 5:
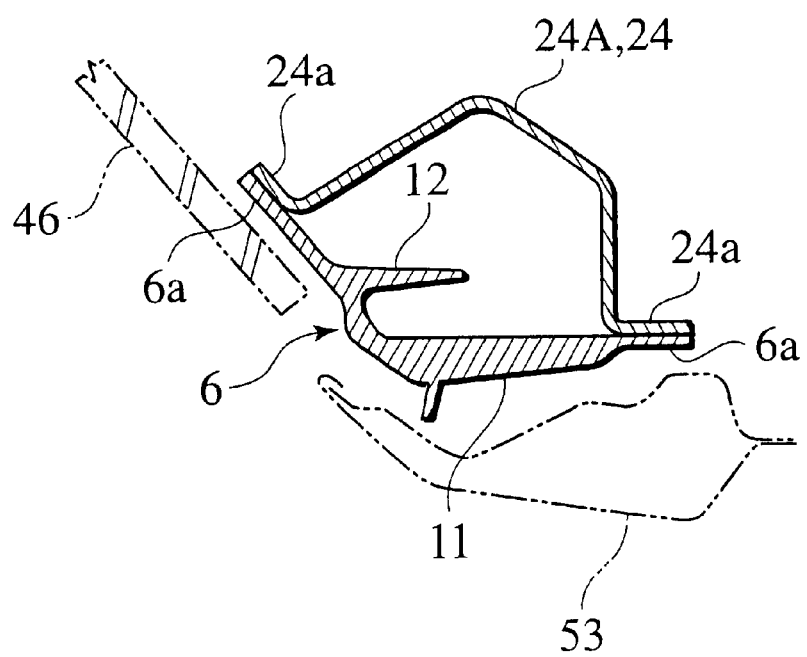
FIG. 5 is a sectional view taken along a line V—V in FIG. 1.
Figure 6:
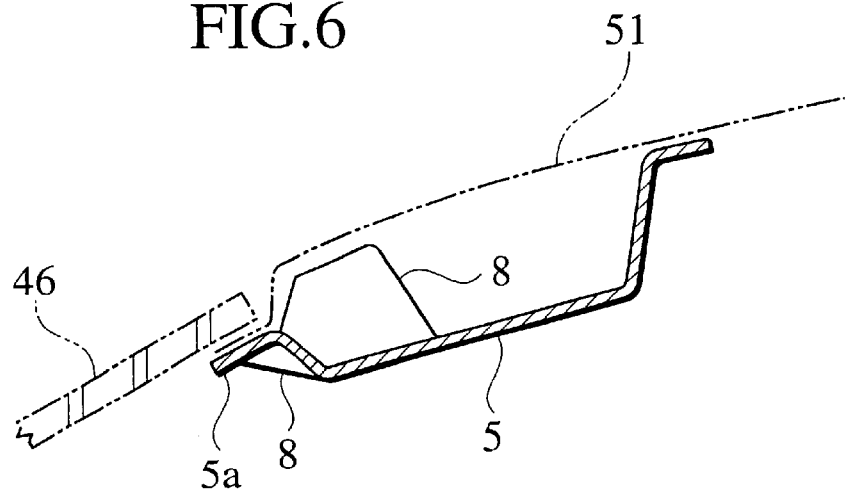
FIG. 6 is a sectional view taken along a line VI—VI in FIG. 1.

As shown in FIGS. 4 to 6, a front window shield 46 is mounted to the front portion 2F. In the roof rail front 5, a reinforcing rib 8 is integrally formed on inner and outer portions around a support of an upper end of the front window shield 46, more specifically, around a bent base of a front edge flange portion 5a. A reinforcing rib 10 is integrally formed on the cowl top 7 inside a junction surface 9 to which a lower end of the front window shield 46 is joined.

A side wall of the front pillar upper outers 6 located outer side in a widthwise direction of the car is formed as a thick portion 11 which is thicker than a front wall portion supporting a side wall portion of the front window shield 46. A reinforcing rib 12 is integrally projected from an inner surface of the front wall portion. The center portion 2C is integrally formed at its front and rear upper edges with left and right roof side rail outers 4C and a roof bow 13 having a flange portion 13a. The roof bow 13 has a reversed hat-like cross section. A connected portion between a bottom surface of the roof bow 13 and an upper surface of the roof side rail outers 4C which are higher than the bottom surface of the roof bow 13 is formed as a slant surface 13b which smoothly connects both the surfaces to each other (see FIGS. 9 and 10).

The rear portion 2R comprises a roof rail rear 15 and rear pillar outers 16 as portions of left and right rear pillar portions. In the present embodiment, a rear parcel 17 is bridged between and integrally formed on lower ends of the left and right rear pillar outers 16.

Figure 7:
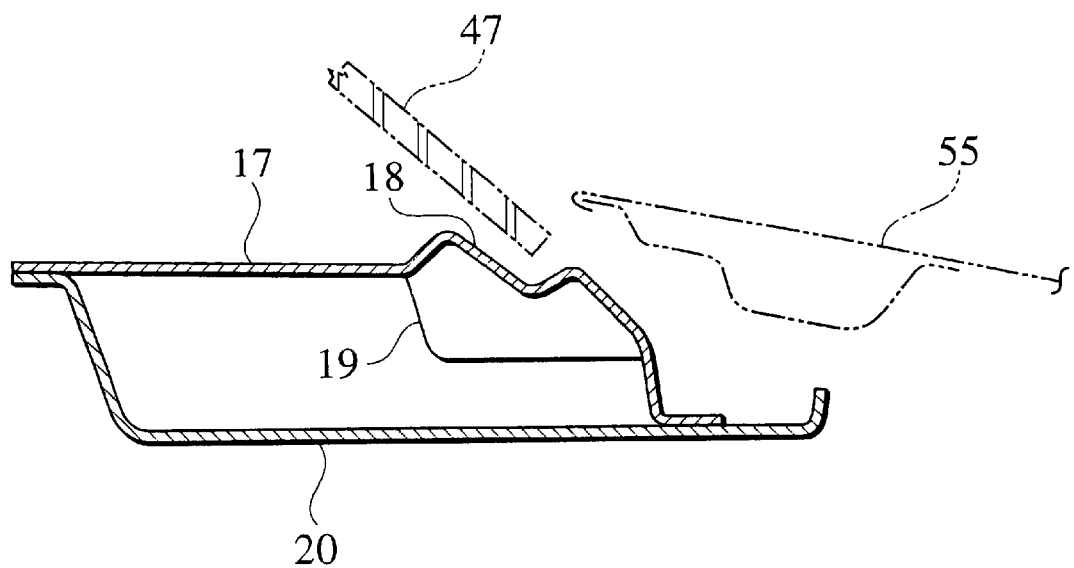
FIG. 7 is a sectional view taken along a line VII—VII in FIG. 1.
Figure 8:
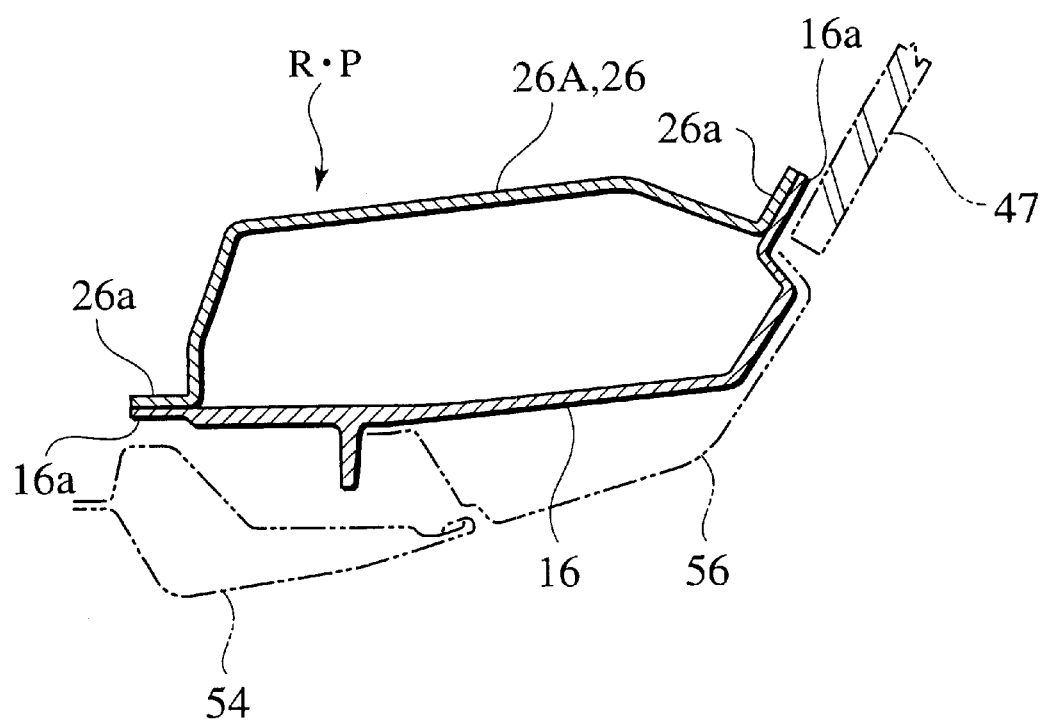
FIG. 8 is a sectional view taken along a line VIII—VIII in FIG. 1.

As shown in FIGS. 7 and 8, a rear window shield 47 is mounted to the rear portion 2R. In the roof rail rear 15, a reinforcing rib 8 is integrally formed around a support portion of an upper end of the rear window shield 47 in the same manner as that of the roof rail front 5.

A parcel reinforcement is joined to a lower portion of the rear parcel 17 to form a closed cross section. The rear parcel 17 is provided with a junction surface 18, and the rear window shield 47 is joined to the junction surface 18. A reinforcing rib 19 is integrally formed on an inside of the junction surface 18.

Figure 13:
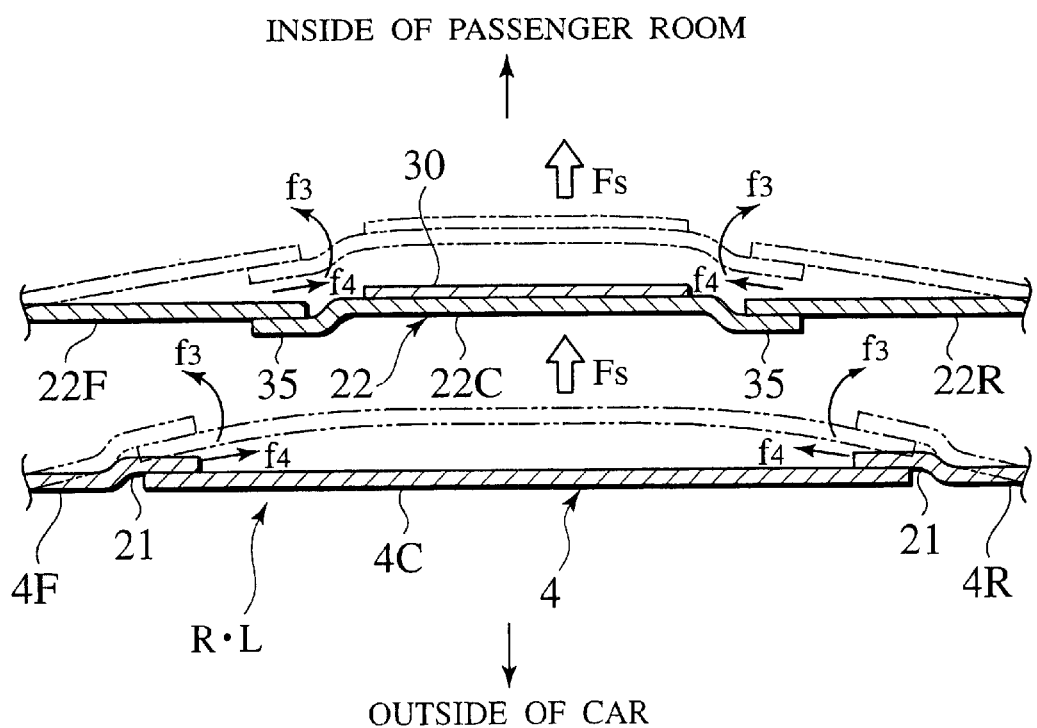
FIG. 13 is a sectional view taken along a line XIII—XIII in FIG. 1.

As will be described later, the roof structure 2 is sub-assembled by assembling and joining (welding or the like) the front portion 22F, the center portion 22C and the rear portion 22F on a sub-line. In the present embodiment, as shown in FIG. 13, in the front portion 22F, the center portion 22C and the rear portion 22R, steps 21 having thickness corresponding to a plate is formed in division ends of roof side rail outers 4F, 4R of the front portion 22F and the rear portion 22R such that the steps 21 are directed inside of the widthwise direction of the car, front and rear division ends of the roof side rail outer 4C of the center portion 22C is superposed on the steps 21, and they are joined by means of welding means having small thermal distortion such as a laser welding.

On the other hand, the body side structure 3 is divided in the longitudinal direction by a roof side rail inner 22C and a side sill outer 23C, and comprises three body side constituent parts, i.e., a front portion 3F having a front pillar 24 as a main body, a center portion 3C having a center pillar 25 as a main body, and a rear portion 3R having a rear pillar 26 as a main body. These body side structure parts are formed by die casting to ensure the surface precision like the above-described roof constituent parts.

Figure 14:
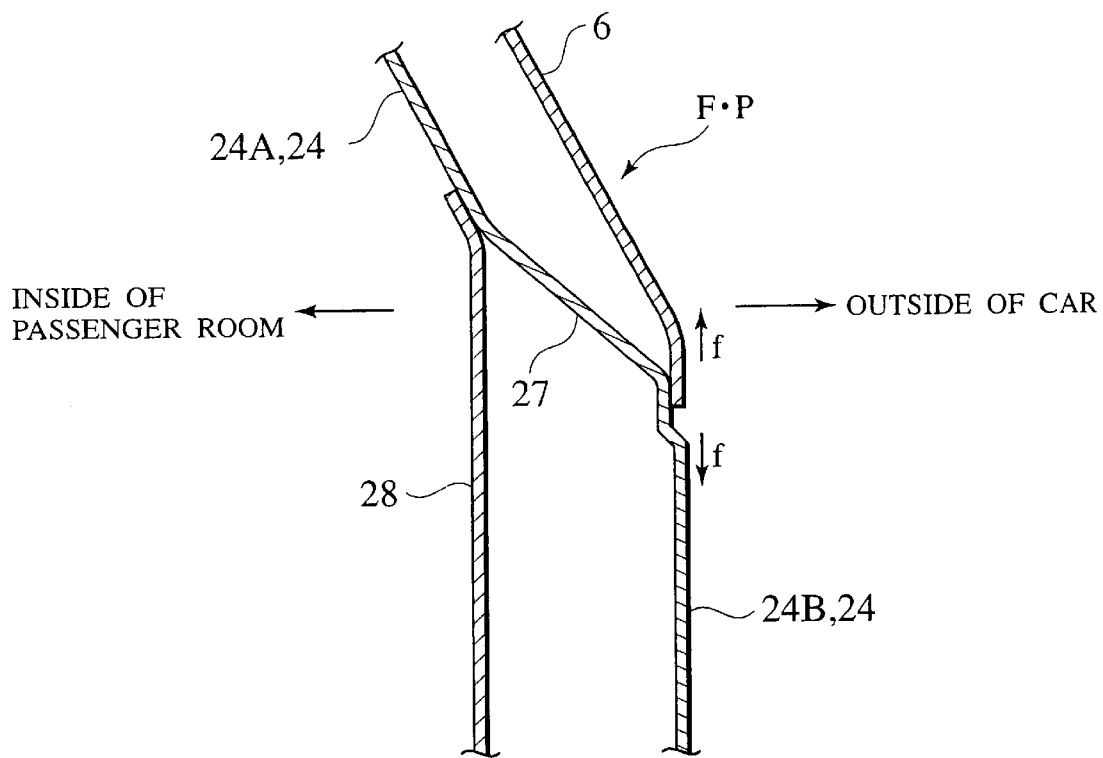
FIG. 14 is a sectional view taken along a line XIV—XIV in FIG. 1.
Figure 15:
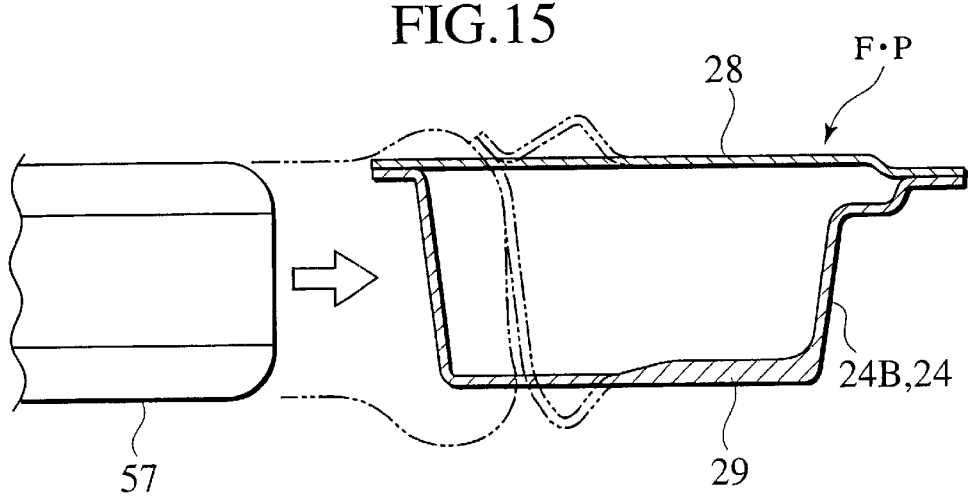
FIG. 15 is a sectional view taken along a line XV—XV in FIG. 1.

As shown in FIGS. 14 and 15, the front pillar 24 of the front portion 3F comprises a front pillar upper inner 24A, and a front pillar lower outer 24B integrally formed with the front pillar upper inner 24A with an inclining connection portion 27 interposed therebetween. A front pillar lower inner 28 is joined to the front pillar lower outer 24B to constitute a closed cross section.

A front portion of the front pillar lower outer 24B is made thinner than its rear portion. As shown in FIG. 15 for example, a substantially rear half portion of a side wall is formed with a thick portion 29 which is thicker than a substantially front half portion so that the front and rear portions are different in thickness.

As shown in FIGS. 9 to 12, in the center portion 3C, the center pillar 25 is integrally formed with the roof side rail inner 22C, a center pillar inner 30 is joined to the center pillar 25 to form center pillars C.P having closed cross section.

Figure 16:
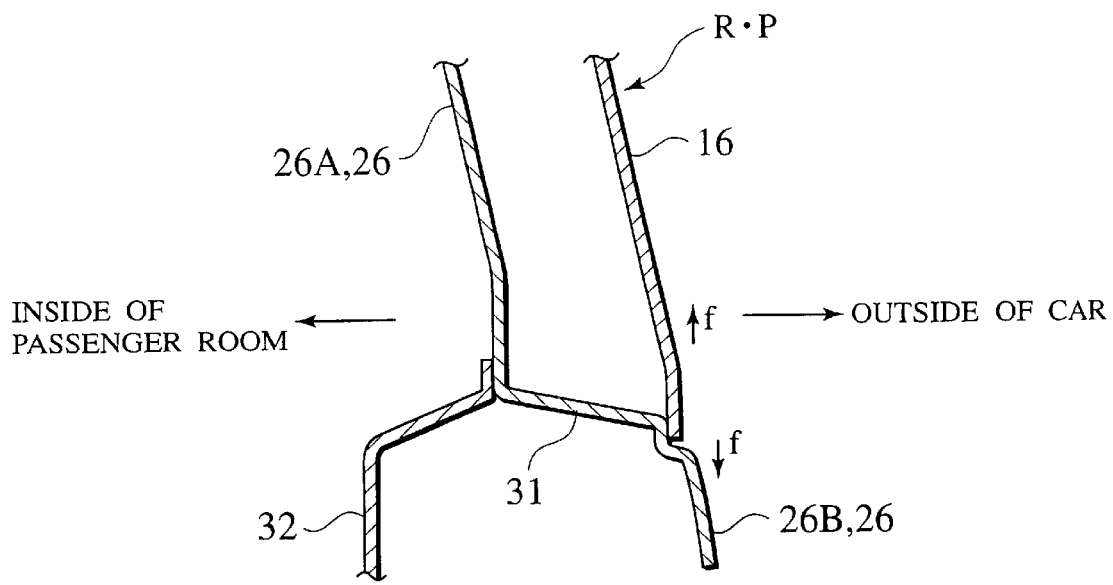
FIG. 16 is a sectional view taken along a line XVI—XVI in FIG. 1.
Figure 17:
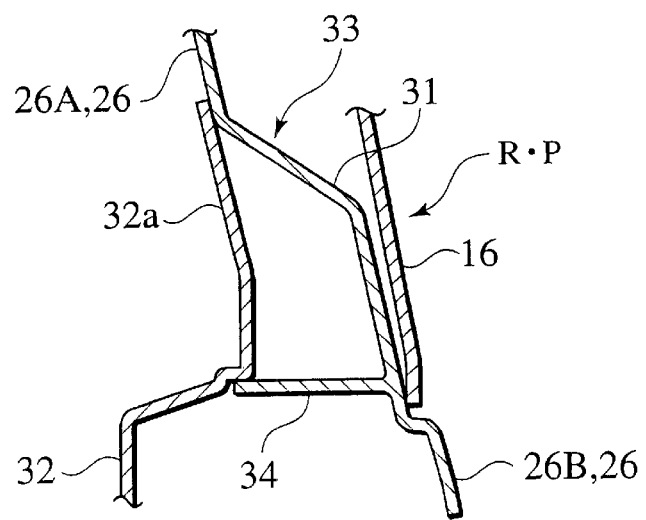
FIG. 17 is a sectional view taken along a line XVII—XVII in FIG. 1.

As shown in FIGS. 16 and 17, the rear pillar 26 of the rear portion 3R comprises a rear pillar inner 26A and a rear wheel house outer 26B integrally formed with the rear pillar inner 26A with a connection portion 31 interposed therebetween. A rear wheel house inner 32 is joined to a rear wheel house outer The connection portion 31 between the rear pillar inner 26A and the rear wheel house outer 26B is formed into a convex shape which partially swells outward. An inner side of the convex shape is covered with an extension portion 23a formed on the rear wheel house inner 32 to constitute a skeleton 33 having a closed cross section. As shown in FIG. 17, in the present embodiment, a rib 34 covering a lower side of the convex shape is integrally formed on a boundary portion between the connection portion 31 and the rear wheel house outer 26B, and an end of the rib 34 is joined to a formation base of the extension portion 2a to close a cross section of the skeleton 33.

As will be described later, the body side structure 3 is sub-assembled by assembling and joining the front portion 3F, the center portion 3C and the rear portion 3F by welding or the like on the sub-line. As shown in FIG. 13, in upper sides of the front portion 3F, the center portion 3C and the rear portion 3R, steps 35 having thickness corresponding to a plate is formed in front and rear division ends of the roof side rail inner 22C of the center portion 3C in an outer side in the widthwise direction of the car, these steps 35 are superposed on outer side of the division end in the widthwise direction of the car of the roof side rail inners 22F, 22R of the front portion 3F and the rear portion 3R, and they are joined by welding means having small thermal distortion such as a laser welding.

A connection portion (corresponding to the formation portion of the step 21) of division ends of the roof side rail outer 4 of the roof structure 2 and a connection portion (corresponding to the formation portion of the step 35) of the 35 division ends of the roof side rail inner 22 of the body side structure 3 are offset in the longitudinal direction of the car body.

In a lower portion of the body side structure 3, division ends of the side sill outers 23F, 23C and 23R on the front portion 3F, the center portion 3C and the rear portion 3R are superposed in the same manner as that of the roof side rail inner 22 as shown in FIG. 1, and they are joined by laser welding or the like.

The upper body 1 is formed such that the roof structure 2 constituted in the above-described manner and the left and right body side structures 3 are joined in a main line which will be described later.

Figure 18:
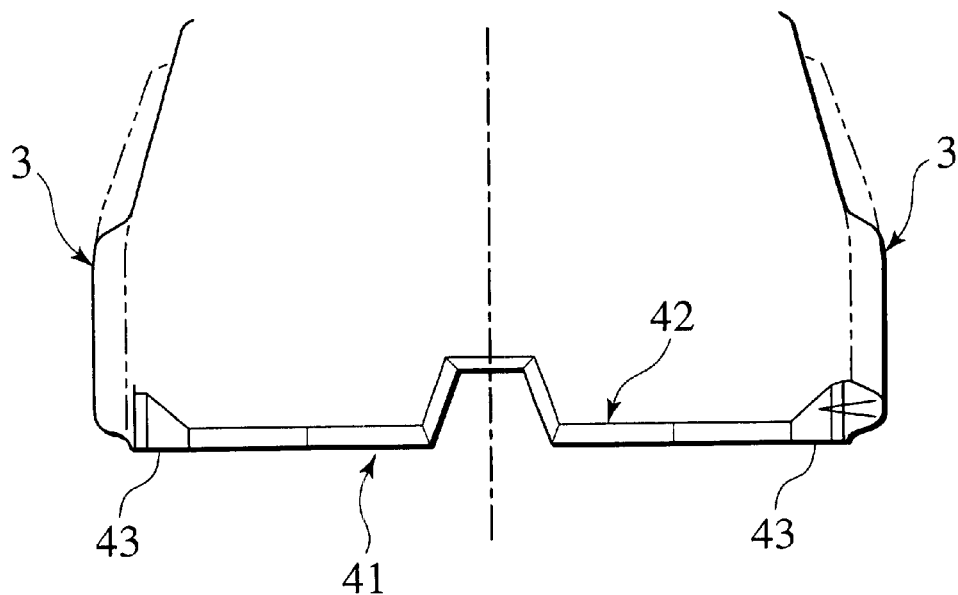
FIG. 18 is a schematic sectional explanatory view showing a mounted state of the body side structure and a lower body.
Figure 19:
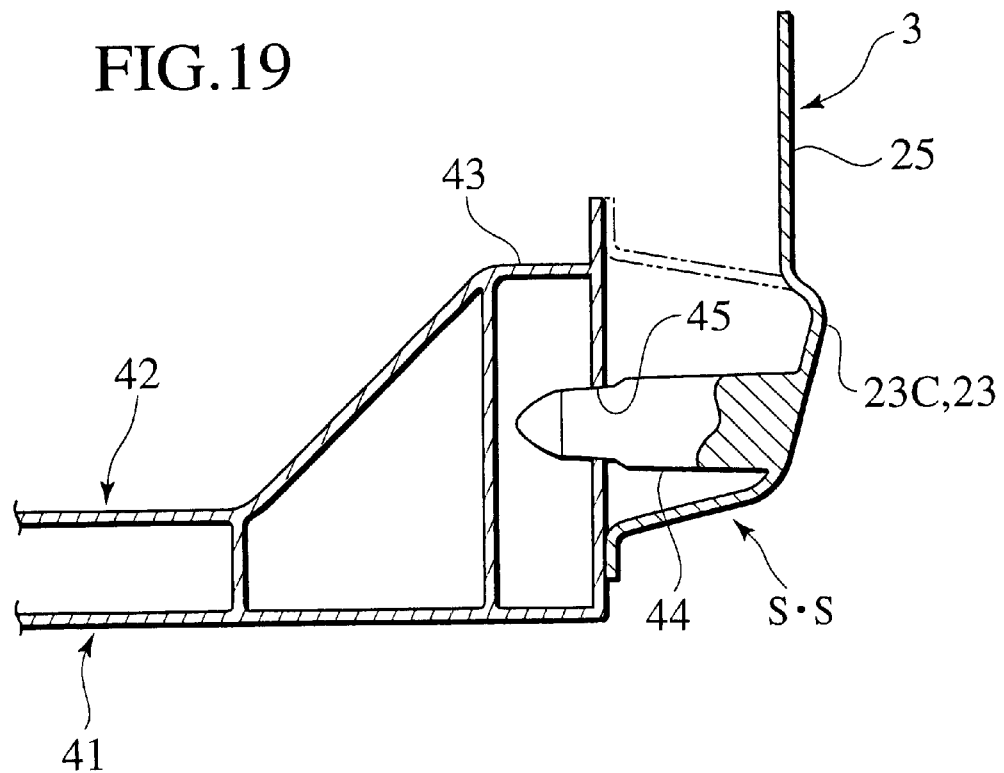
FIG. 19 is a sectional view showing a positioning structure of he body side structure and the lower body.

More specifically, as shown in FIGS. 18 and 19, the left and right body side structures 3 are joined to a lower body 41 having a floor member 42 as a main body, the roof structure 2 is lowered from above, the roof side rail outer 4 and the rear pillar outers 16 are superposed on the front pillar upper inner 24A, the roof side rail inner 22, and the rear pillar inner 26A of the left and right body side structures 3 from outside of the car. Each of these superposed portions comprises flanges 6a, 4a, 16a and flanges 24a, 22a, and 26a which abut against each other. These flanges 6a, 24a, 4a, 22a and the flanges 16a, 26a are superposed and joined by welding means having small thermal distortion such as a laser welding, and cross section of each of front pillars F.P, roof side rails R.L, and rear pillars R.P is closed (see FIGS. 5, 8 and 12).

As shown in FIGS. 14, 16 and 17, lower terminals of the front pillar upper outers 6 and the rear pillar outers 16 are superposed on an outer surface of the front pillar lower outer 24B and an outer surface of the rear wheel house outer 26B, respectively, they are joined by laser welding, thereby covering the connection portion 27 between the front pillar upper inner 24A and the front pillar lower outer 24B and the connection portion 31 between the rear pillar inner 26A and the rear wheel house outer 26B.

The floor member 42 is, in one aspect, made of the light-metal used for the roof structure 2 and the body side structures 3. Floor member 42 may be formed by extrusion to correspond to a longitudinal direction of the car body, although any other conventional processing method known to those skilled in the art to form longitudinally elongated parts may be advantageously employed in accord with the invention. The cross section of floor member 42 is closed. As shown in FIGS. 18, and 19, the side still outer 23 of the body side structure 3 is superposed on a side surface of the side sill 43, they are joined by laser welding or the like to form the side sill S S having closed crossed section.

When the body side structure 3 is assembled into the floor member 42, as shown in the drawing, a positioning operation is carried out in the longitudinal direction and vertical direction using a locate pin 44 and a locate hole 45 used as general positioning means and the welding is carried out. In the illustrated example, the locate pin 44 is integrally projected from a back side of the side sill outer 23, and the side sill 43 of the floor member 42 is formed with the locate hole 45.

Figure 9:
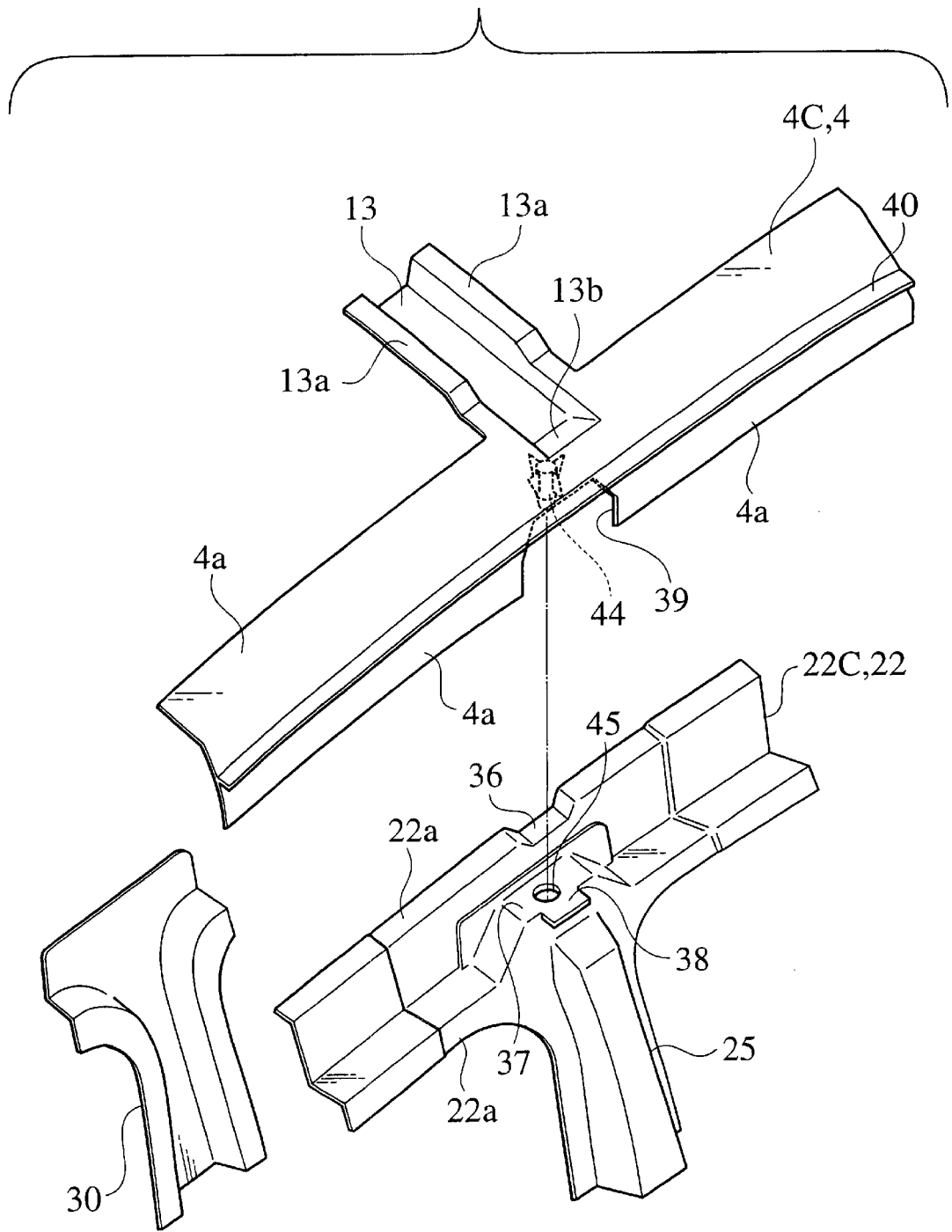
FIG. 9 is an exploded perspective view of a structure around a connected portions between a center pillar and a roof bow.
Figure 10:
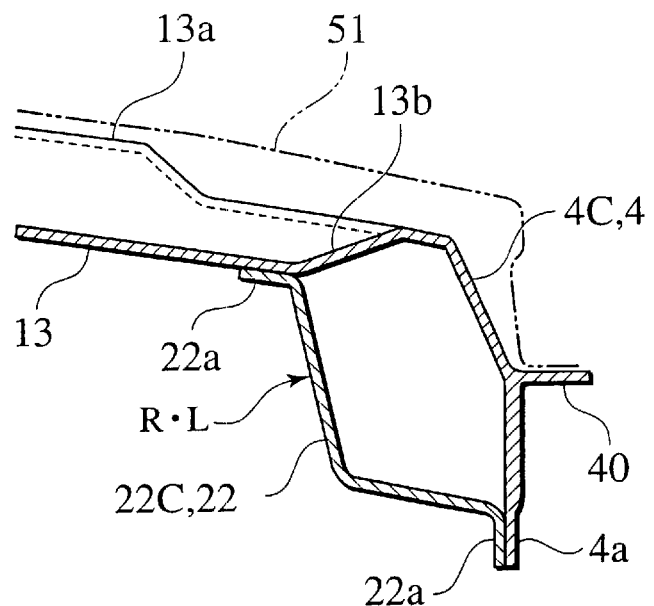
FIG. 10 is a sectional view taken along a line X—X in FIG. 1.
Figure 11:
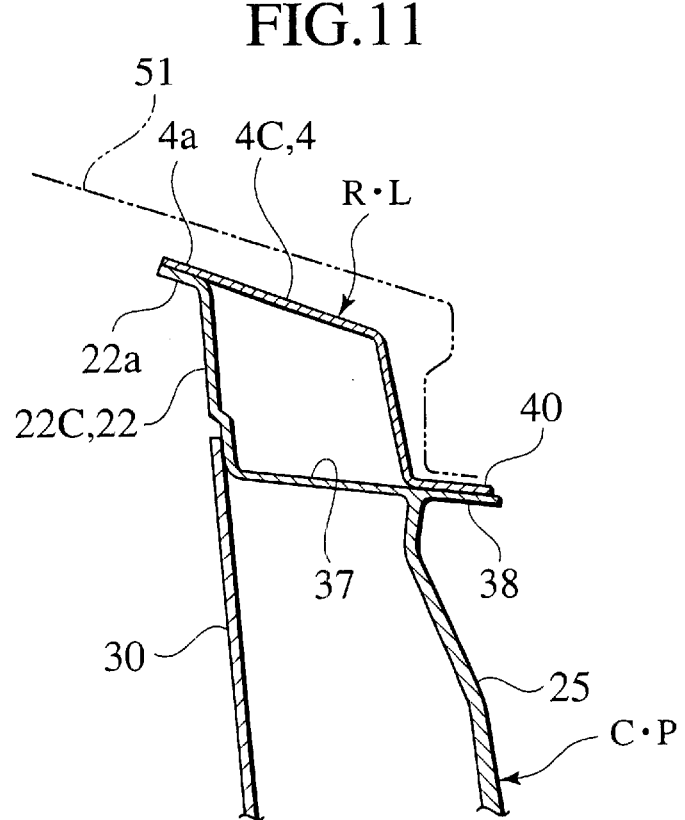
FIG. 11 is a sectional view taken along a line XI—XI in FIG. 1.
Figure 12:
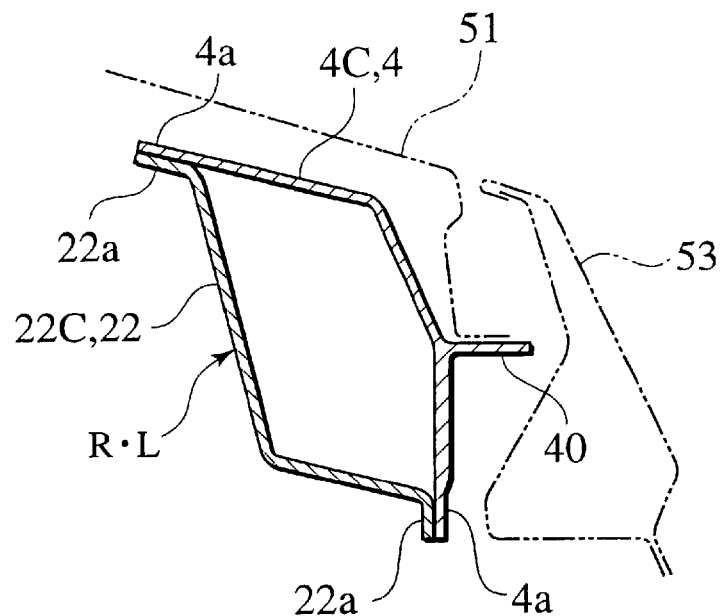
FIG. 12 is a sectional view taken along a line XII—XII in FIG. 1.

On the other hand, in the roof structure 2 and the left and right body side structures 3, positioning of the roof structure 2 and the body side structures 3 in the widthwise direction of the car is carried out by superposing the front pillar upper outers 6, the roof side rail outer 4 and the rear pillar outers 16 on the respective front pillar upper inner 24A, the roof side rail inner 22 and the rear pillar inner 26A from outside of the car as described above. As shown in FIGS. 1 and 9, positioning of the roof structure 2 and the body side structures 3 in the longitudinal direction of the car body and the vertical direction is carried out by engagement between the roof bow 13 and the recess 36 formed in the roof side rail inner 22C of the body side structure 3 corresponding to the roof bow 13, and engagement between the flange 38 projected from an outer edge of a variation surface 37 swelling upward from the connection portion between the roof side rail inner 22C and the center pillar 25, a notch 39 formed in the roof side rail outers 4C of the roof structure 2 corresponding to the flange 38 and a roof-joining flange 40. As positioning means for optimizing the positioning in the widthwise direction of the car and the longitudinal direction of the car body, engaging means comprising general type locate pin 44 and the locate hole 45 is employed.

In the illustrated example, the locate pin 44 is integrally projected from a backside of a portion where the roof bow 13 and the roof side rail outers 4C are collected, and the locate hole 45 is formed on an upper wall of the variation surface 37 where the center pillar 25 and the roof side rail inner 22C are collected.

In the present embodiment, as positioning means at the time of assembling of the roof structure 2 and the body side structures 3, in addition to the center portions 2C and 3C, as shown in FIGS. 1 to 3, the lower end of the front pillar upper outers 6 and the upper end of the front pillar lower outer 24B are provided with the locate pin 44 and the locate hole 45, and the locate pin 44 and the lower end of the rear pillar outers 16 in each of the rear portions 2R and 3R and the upper portion of the rear wheel house outer 26B are respectively provided with the locate pin 44 and the locate hole 45 so that the positioning is reliably carried out at three points, i.e., the front portions 2F, 3F, the center portions 2C, 3C and the rear portions 2R, In FIGS. 4 to 11, the reference number 51 represents a roof panel, the reference number 52 represents a dash upper of the lower body 41, the reference number 53 represents a front door, the reference number 54 represents a rear door, the reference number 55 represents a trunk lid, and the reference number 56 represents a rear pillar finisher.

Figure 23:
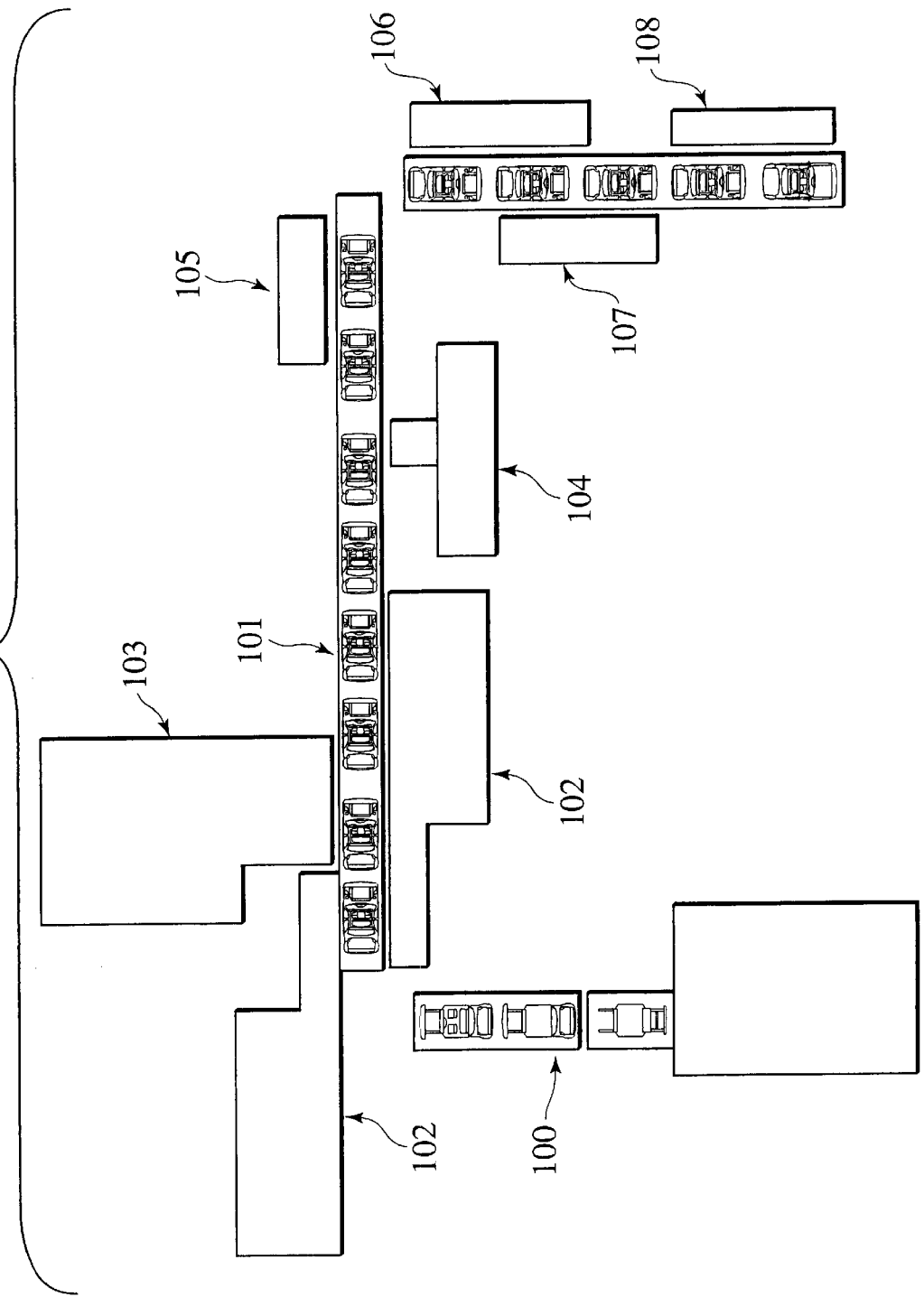
FIG. 23 is an explanatory view showing a car body assembling line of the embodiment of the invention.

FIG. 23 schematically shows a car body assembling line. In a lower body sub-line 100, a dash module, a rear end module and the like are sequentially assembled into the extruded floor member 42, thereby forming the lower body 41, and various lower body function parts are assembled, and they are transferred to a main line 101 as a lower body unit.

In the body side sub-line 102, as shown in FIGS. 1 and 3, three body side constituent parts, i.e., the casted front portion 3F, the center portion 3C and the rear portion 3R are assembled to constitute the left and right body side structures 3, various body side function parts are assembled, and the left and right body side structures 3 are assemble into the lower body unit in the main line 101.

As shown in FIGS. 1 and 2, in a roof sub-line 103, the three roof constituent parts, i.e., the casted front portion 2F, the center portion 2C and the rear portion 2R are assembled to constitute the roof structure 2, various roof function parts are assemble, and in the main line 101, the roof structure 2 is assembled on the left and right body side structures 3 to constitute the upper body 1, and the car body is formed.

In a running parts mounting step apparatus 104, an under running unit comprising an engine, a power train and suspension is assemble into the car body. In an exterior parts step apparatus 105, a front end module, a front bumper, a rear bumper and the like are assembled.

Next, in an outer plate step apparatus 106, a roof resin outer plate, a front fender resin outer plate, a rear fender resin outer plate, a trunk lid resin outer plate and an engine hood resin outer plate are assembled into the car body. In a window step apparatus 107, a front window shield and a rear window shield are mounted. In a door step apparatus 108, left and right door units are assembled. Then, the assembling operation of the vehicle is completed.

In the roof structure 2 and the body side structure 3, the plurality of roof constituent parts and the body side constituent parts which were formed of lightweight metal material and by casting and divided in the longitudinal direction are sub-assembled by the sub-lines 103 and 102, respectively. Therefore, the roof constituent parts and the body side constituent parts can easily be formed with excellent formation precision by means of casting. In addition to this, the part is formed by casting smaller. Therefore, the formation precision of each of the roof constituent parts and the body side constituent parts is extremely high, the roof constituent parts and the body side constituent parts are assembled and connected by welding in the respective sub-lines 103 and 102 and thus, the formation precision of each of the roof structure 2 and the body side structure 3 can be enhanced.

Then, the roof structure 2 and the left and right body side structures 3 which are sub-assembled and whose precision was secured are connected on the main line 101. Therefore, portions of the roof structure 2 and the body side structures 3 which were difficult to obtain precision on the main line 101 are supplemented by the structures 2 and 3, so that the assembling precision can be remarkably enhanced. The precision of the roof structure 2 and the body side structures 3 can be supplemented by each other to enhance the assembling precision, and the structures 2 and 3 serve as positioning jigs. Therefore, the number of jigs for assembling the car body can largely be reduced, and the assembling operability can be enhanced.

Since each of the roof structure 2 and the body side structures 3 is made of light-metal casting parts, rigidity of the car body can largely be enhanced.

Here, especially in the present embodiment, in each the roof structure 2 and the body side structures 3, an essential skeleton portion of the upper body 1 is finely divided into the three constituent parts, i.e., the front portions 2F, 3F, the center portions 2C, 3C and the rear portions 2R, 3R which can be left in integrally formed states. Therefore, the formation precision of each of the constituent parts can be enhanced, the rigidity of the essential skeleton portion of the upper body 1 can be maintained at high level, and especially since the cross section of each of the front pillar F.P, the roof side rail R.L and the rear pillars R.P is closed, the rigidity can be largely enhanced.

Further, the division portions are set in the roof side rail R.L and the side sill S.S which has the longitudinal skeleton portion of the upper body 1, and the division ends thereof are superposed and connected by welding. Therefore, the longitudinal error of each of the parts can be absorbed by longitudinally adjusting the superposed level of the division ends, and the formation precision of each of the roof structure 2 and the body side structures 3 can be enhanced.

In the roof structure 2, the cowl top 7 and the rear parcel 17 which are difficult be assembled with high precision are integrally formed on the front portion 2F and the rear portion 2R. Therefore, the assembling precision of the upper body 1 can further be enhanced, and the mounting precision of each of the front window shield 46 and the rear window shield 47 can be enhanced.

Further, the reinforcing ribs 8 and 10 are integrally formed on the roof rail front 5 which supports the upper and lower ends of the front window shield 46 and the window shield support portions of the cowl top 7. The reinforcing ribs 8 and 19 are integrally formed on the roof rail rear 15 supporting the upper and lower ends of the rear window shield 47 and the window shield support portions of the rear parcel 17. Therefore, it is of course possible to enhance the rigidity of each of the roof rail front 5, the cowl top 7, the roof rail rear 15 and the rear parcel 17, the supporting rigidity of the front window shield 46 and the rear window shield 47 can be enhanced, the mounting stability of the window shields 46 and 47 can be enhanced, and the mounting precision of the window shields 46 and 47 can further be enhanced.

The assembling properties of the roof structure 2 and the body side structures 3 will be described in detail. The roof side rail outer 4, the front pillar upper outers 6 and the rear pillar outers 16 of the roof structure 2 are superposed on and connected to the corresponding roof side rail inner 22, the front pillar upper inner 24A and the rear pillar inner 26A of the body side structure 3 from outside of the car. Therefore, it is possible to easily lower the roof structure 2 onto the left and right body side structures 3 from above and assemble them. At that time, the error can be absorbed by sliding adjustment between the flanges 4a, 22a, the flanges 6a, 24a, and the flanges 16a, 26a of the superposed portions, the positioning in the widthwise direction and the longitudinal direction of the car body can appropriately be carried out by the locate pin 44 and the locate hole 45 as positioning means at the three points, i.e., the engagement between the front portions 2F, 3F, the centers 2C, 3C and the rear portions 2R, 3R. Therefore, the assembling operation can easily be carried out, and the assembling precision can further be enhanced.

Figure 20:
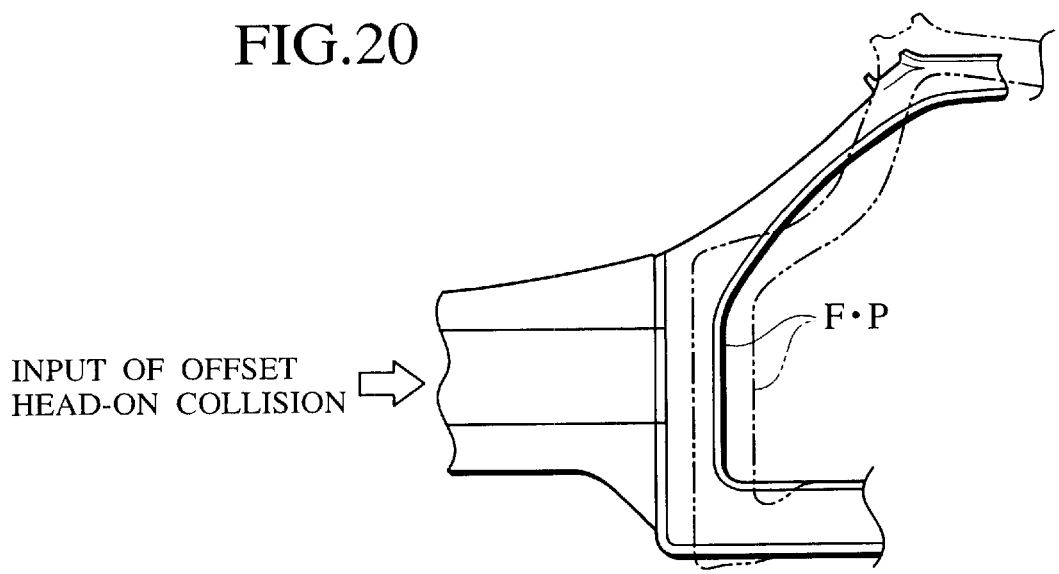
FIG. 20 is a schematic side explanatory view showing a deformed state of a front pillar at the time of front offset collision.
Figure 21:
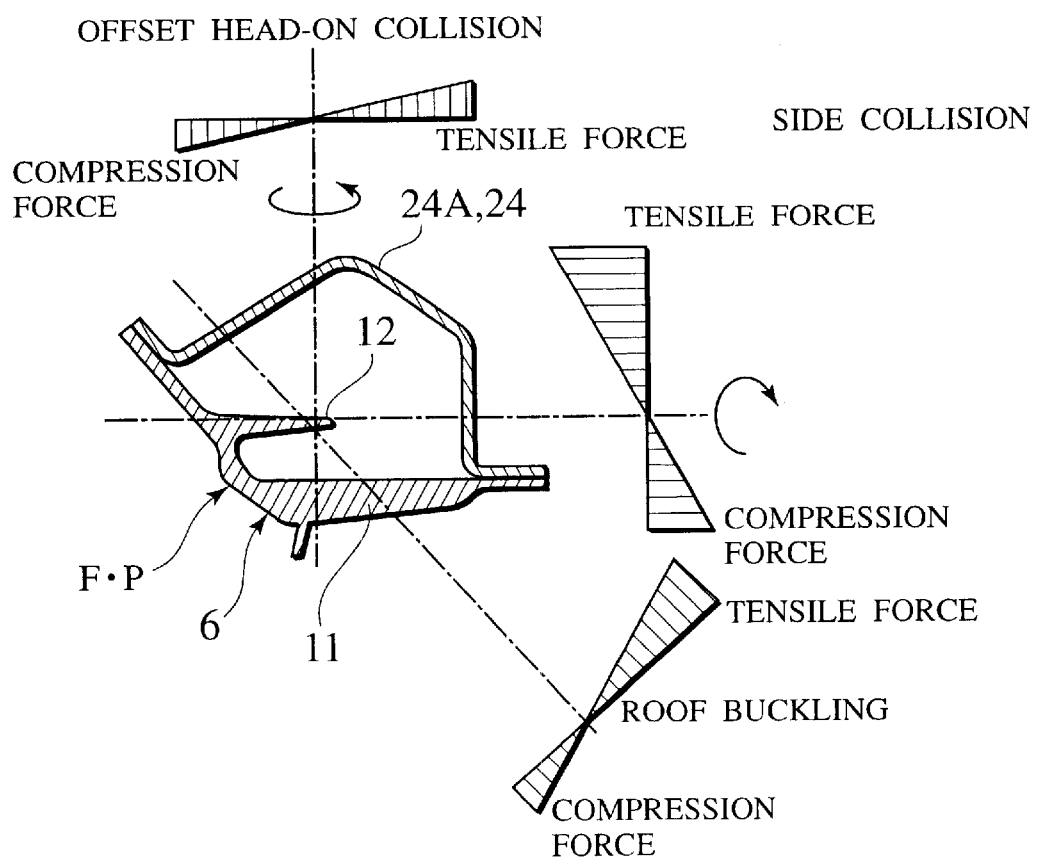
FIG. 21 is an explanatory view showing a generation state of compression stress and tensile stress against various loads of a front pillar upper portion.

Concerning physical characteristics of the upper body 1 assembled in this manner, first, in the front pillar F.P, the side wall of the front pillar upper outers 6 is formed as the thick portion 11, the reinforcing rib 12 is projected from the inner surface of the front wall, and a bending center of the cross section of the front pillar upper is deviated outward in the widthwise direction of the car as shown in FIG. 21. Therefore, as shown in FIG. 20 for example, it is possible to reduce a compression stress at the side of the pillar outer generated by bending deformation (phantom line in the drawing) of the front pillar F.P by the offset head-on collision applied to the vehicle, a surface outer buckling is less prone to be generated, it is possible to reduce the compression stress at the side of the pillar outer with respect to a load by roof buckling, and an input of the connection portion of the lower terminal of the front pillar upper outers 6 with respect to the various loads can be received in sharing direction which is advantageous in term of strength as shown with an arrow f in FIG. 14.

Further, as shown in FIG. 15, with respect to backward movement of a front tire 57 at the time of the offset head-on collision, resistance of the thickness portion 29 of the rear portion of the front pillar lower outer 24B is enhanced, the front side of the thick portion is destroyed under pressure and the collision energy can be absorbed, and it is possible to restrain the rear side of the front pillar lower outer 24B from being deformed and moved toward the door.

From these facts, it is unnecessary to increase the thickness of the entire front pillar F.P as the resisting means against the various loads, which is advantageous in terms of weight and materials.

Figure 22:
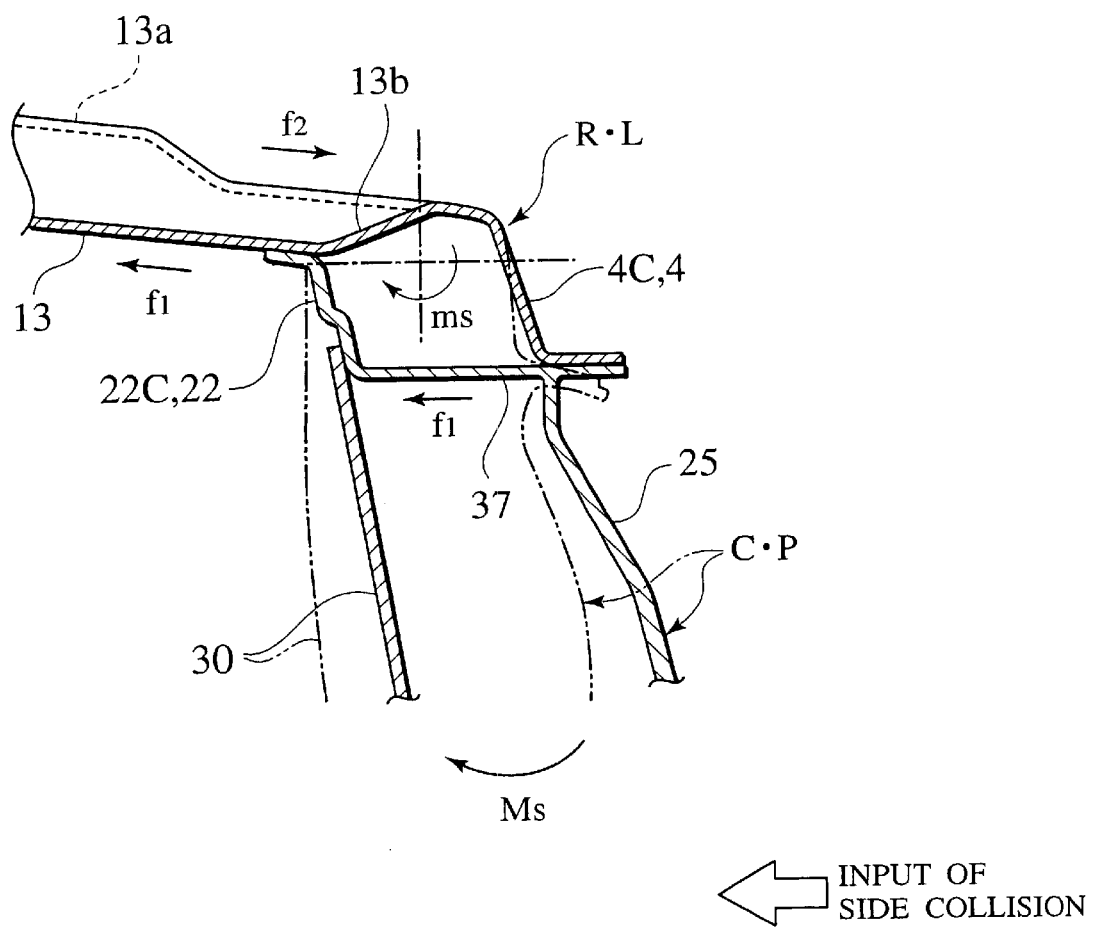
FIG. 22 is an explanatory view showing an input transmitting state at the time of broadside collision around connected portions between the center pillar and the roof bow.

Next, concerning the center pillar C.P, the connection portion between the bottom surface of the roof bow 13 which is the roof skeleton member extending in the widthwise direction of the car with respect to the center pillar C.P and the upper surface of the roof side rail outer 4 which is higher than the bottom surface is formed as the slant surface 13b which smoothly connects both the surfaces. Therefore, as shown in FIG. 22, a force Ms generated inward of the passenger room of the center pillar C.P at the time of side collision is transmitted and dispersed to the variation surface 37 between the center pillar 25 and the roof side rail inner 22 as shown with an arrow f1, moment Ms inward the passenger room is applied to the roof side rail R.L as torsion input, and if the roof side rail R.L exhibits behavior that the rail deforms inward while rotating downward, the force is converted into a compression load f1 of the bottom surface and the tensile load f2 of the upper edge flange 13a and transmitted to the roof bow 13 by the slant surface 13b, and these bottom surfaces can be effectively utilized as the compression member, the upper flange 13a can be effectively utilized as the tensile member, the force can efficiently be dispersed toward the body side on the opposite side from the car body by the roof bow 13, and the deformation of the upper portion of the center pillar C.P toward the passenger room can be suppressed to a lower level.

Therefore, it is unnecessary to increase the thickness of the entire center pillar C.P as the resisting means against the side collision, which is advantageous in terms of weight and materials.

In the roof side rail R.L, division ends of the center portion 4C of the roof side rail outer 4 and the center portion 22C of the roof side rail inner 22 are superposed on and coupled to division ends of the front portion and the rear portions 4F, 4R, 22F and 22R outward in the widthwise direction of the car. Therefore, as shown in FIG. 13, the load can be dispersed as the bending input f3 of the front portion 4F, 22F and the rear portions 4R, 22R from the center portions 4C, 22C with respect to the input Fs of the center pillar C.P toward the passenger room by the side collision, and concerning the bending deformation of the roof side rail outer 4 and the roof side rail inner 22 shown with the phantom line in FIG. 13, the connection portion of these division ends can receive the input in the sharing direction which is advantageous in terms of strength as shown with an arrow f4.

Further, the connection portion between the division ends of the roof side rail outer 4 and the connection portion of the division ends of the roof side rail inner 22 are deviated in the longitudinal direction, and narrow variation in local closed cross sectional area of the roof side rail R.L can be reduced to small level. Therefore, it is possible to restrain the local buckling with respect to the bending input of the roof side rail R.L due to the side collision can be restrained.

From the above facts, it is unnecessary to increase the thickness of the entire roof side rail R.L as the resisting means against the side collision load and the like, which is advantageous in terms of weight and materials.

Further, in the rear pillar R.P, since the skeleton 33 having the closed cross section is formed at the connection portion between the rear pillar inner 26A and the rear wheel house outer 26B, the rigidity of the connection portion is enhanced, the local antiplane deformation of the rear pillar inner 26A due to the input to the rear suspension or the rear pillar R.P at the time of the rear collision is restrained, and it is possible to efficiently disperse and bear the collision load to the entire roof structure 2.

Further, it is possible to receive the input of the connection portion of the lower terminal of the rear pillar outers 16 in the sharing direction which is advantageous in terms of strength as shown with the arrow f in FIG. 16.

From the above facts, it is unnecessary to increase the thickness of the entire rear pillar R.P as the resisting means against the various loads, which is advantageous in terms of weight and the materials.

The entire content of Japan patent Application P2000-124373 with a filling date of Apr. 25, 2000, is incorporated herein by reference.

Although the invention has been described above by reference to certain embodiments of the invention, the invention is not limited to the embodiments described above will occur to these skilled in the art, in the teachings. The scope of the invention is defined with reference to the following claims.

What is claimed is:

1. A body structure of a vehicle comprising:
    a roof structure formed by connecting a plurality of roof parts made of light-metal formed by casting, said roof parts being divided in a longitudinal direction,
    left and right body side structures obtained by connecting a plurality of body side parts made of light-metal formed by casting, said body side parts being divided in a longitudinal direction, wherein
    said left and right body side structures and roof structure are connected to each other and form an upper body,
    said roof structure is divided in the longitudinal direction by left and right roof side rails, said roof structure comprises three roof parts provided with:
        a front portion which includes a roof front rail and left and right front pillar and which mounts a front window shield;
        a center portion which has a roof bow and left and right roof side rails; and
        a rear portion comprising a roof rail rear and left and right rear pillar and which mount a rear window shield, and wherein
    division ends of roof side rails of said front portion and said rear portion are superposed on and connected to division end of a roof side rail of said center portion.

2. A body structure of a vehicle according to claim, 1, wherein
    said left and right body side structures are respectively divided in the longitudinal direction by a roof side rail portion and side sill portion, each of said body side structures comprising three body side parts provided with:
        a front portion having a front pillar as a main body;
        a center portion having a center pillar as a main body; and
        a rear portion having a rear pillar as a main body, and wherein
        a division end of each of the roof side rails of the front portion and the rear portion and a division end of the side sill portion are superimposed on and connected to a division end of the roof side rail of the center portion and a division end of the side sill portion, and
    said roof structure and left and right body side structures are connected to each other, cross sections of at least said front pillar, said roof side rail and said rear pillar are closed.

3. A body structure of a vehicle according to claim 3, wherein
    each of said roof rail front and said roof rail rear of said front and rear portion of said roof structure is integrally provided around a support of an upper end of said window shield with a reinforcing rib.

4. A body structure of a vehicle according to claim 1, wherein
    said front portion of said roof structure is integrally provided with a cowl top which includes a junction surface for joining a lower end of said front window shield and which is astride between left and right front pillars.

5. A body structure of a vehicle according to claim 4, wherein
    said junction surface formed on said cowl top is provided at its inner side with a reinforcing rib.

6. A body structure of a vehicle according to claim 1, wherein
    said rear portion of said roof structure is integrally provided with a rear parcel which includes a junction surface for joining a lower end of said rear window shield and which is astride between left and right rear pillars.

7. A body structure of a vehicle according to claim 6, wherein
said junction surface formed on said rear parcel is provided at its inner side with a reinforcing rib.

8. A body structure of a vehicle according to claim 1 wherein
said roof side rail, said front pillar and said rear pillar of said roof structure respectively comprise a roof side rail outer, a front pillar upper outer and a rear pillar outer,
said roof side rail, said front pillar and said rear pillar of said body side structure respectively comprise a front pillar upper inner, a front pillar lower outer which is integral with said front pillar upper inner, a rear pillar inner, and a rear wheel house outer which is integral with said rear inner,
said roof side rail outer, said front pillar upper outer and said rear pillar outer of said roof structure are superposed on said corresponding roof side rail inner, said front pillar upper inner and said rear pillar inner from outside of a car.

9. A body structure of a vehicle according to claim 8, wherein
superposed portions between said roof side rail outer, said front pillar upper outer, said rear pillar outer of said roof structure and said roof side rail inner, said front pillar upper inner, said rear pillar inner of said body side structure comprise flanges which abut against each other.

10. A body structure of a vehicle according to claim 8, wherein
a side wall of said front pillar upper outer of said front portion of said roof structure located outside in a widthwise direction of the car is made thicker than a front wall of said front pillar upper outer, said front wall is integrally provided at its inner surface with a reinforcing rib.

11. A body structure of a vehicle according to claim 8, wherein
a connection portion between a bottom surface of a roof bow of said center portion of said roof structure and an upper surface of said roof side rail outer which is higher than said bottom surface is formed as a slant surface which smoothly connects both said bottom surface and said upper surface.

12. A body structure of a vehicle according to claim 8, wherein
a front side of said front pillar lower outer of said front portion of said body side structure is made thinner than a rear side of said front pillar lower outer.

13. A body structure of a vehicle according to claim 8, wherein
a connection portion between said rear pillar inner and said rear wheel house outer of said rear portion of said body side structure is formed into a convex shape which swells outward, said rear wheel house inner is connected to said rear wheel house outer such as to cover an inside of said convex shape, a skeleton portion having an opened or closed cross section is formed in said connection portion.

14. A body structure of a vehicle according to claim 1, wherein
division ends of said roof side rails of said center portions of said roof structure and said body side structure are superposed on and connected to division ends of said roof side rails of said front portion and said rear portion outside in the widthwise direction of the car.

15. A body structure of a vehicle according to claim 14, wherein
set positions of a connection portion between the division ends of said roof side rail of said roof structure and a connection portion between the division ends of said roof side rail of said body side structure are deviated in the longitudinal direction of said car body.

16. A body structure of a vehicle according to claim 8, wherein
a lower terminal of said front pillar upper outer of said front portion of said roof structure is superposed on an outer surface of said front pillar lower outer such as to cover a connection portion between said front pillar upper inner and said front pillar lower outer of said front portion of said body side structure, and a lower terminal of said rear pillar upper outer of said rear portion of said roof structure is superposed on an outer surface of said rear wheel house outer such as to cover a connection portion between said rear pillar inner and said-rear wheel house outer of said rear portion of said body side structure.

17. A body structure of a vehicle according to claim 1, wherein
said roof structure and said body side structure are positioned and connected to each other in a widthwise direction and a longitudinal direction of said car body by means of positioning means at a portion where said roof bowl and said roof side rail in said center portion of at least said roof structure are collected and at a portion where said center pillar and said roof side rail of said center portion of the corresponding body side structure.

18. A body structure of a vehicle according to claim 17, wherein
said positioning means includes engaging means comprising a locate pin and a locate hole.

19. An upper body structure of a vehicle comprising:
a roof structure means for connecting a plurality of roof parts divided in a longitudinal direction by left and right roof side rails, said plurality of roof parts comprising a front portion including a roof front rail and left and right front pillars configured to receive a front windshield, a center portion having a roof bow and left and right roof side rails, and a rear portion comprising a roof rail rear and left and right rear pillars configured to receive a rear window, and wherein division ends of roof side rails of said front portion and said rear portion are superposed on and connected to division end of a roof side rail of said center portion, and
left body side structure means for connecting a plurality of body side parts divided along a longitudinal direction, said plurality of body side parts comprising a front portion having a front pillar, a center portion having a center pillar, and a rear portion having a rear pillar,
right body side structure means for connecting a plurality of body side parts divided along a longitudinal direction, said plurality of body side parts comprising a front portion having a front pillar, a center portion having a center pillar, and a rear portion having a rear pillar,
wherein said upper body structure comprises an assembly of said left body side structure means, said right body side structure means and said roof structure means.

* * * * *